United States Patent
Pearce

(10) Patent No.: US 7,345,378 B2
(45) Date of Patent: Mar. 18, 2008

(54) POWER SUPPLY CIRCUIT CONTAINING MULTIPLE DC—DC CONVERTERS HAVING PROGRAMMABLE OUTPUT CURRENT CAPABILITIES

(75) Inventor: Lawrence George Pearce, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 400 days.

(21) Appl. No.: 11/006,006

(22) Filed: Dec. 7, 2004

(65) Prior Publication Data

US 2006/0119992 A1 Jun. 8, 2006

(51) Int. Cl.
*H02J 1/10* (2006.01)
*H03K 19/094* (2006.01)
*H03K 19/082* (2006.01)

(52) U.S. Cl. .......................... 307/24; 307/18; 307/29; 307/31; 307/32; 307/131; 326/48; 326/49

(58) Field of Classification Search .................. 307/18, 307/24, 29, 31, 32, 53, 54, 55, 56, 58, 59, 307/60, 61, 62, 63, 75, 82, 85, 113, 131; 326/48, 49
See application file for complete search history.

(56) References Cited

U.S. PATENT DOCUMENTS

| 4,659,942 A * | 4/1987 | Volp .............................. 307/19 |
| 5,625,546 A * | 4/1997 | Schaal .......................... 363/71 |
| 5,808,879 A * | 9/1998 | Liu et al. ....................... 363/17 |
| 6,018,233 A * | 1/2000 | Glennon ........................ 322/22 |
| 6,037,752 A * | 3/2000 | Glennon ........................ 322/22 |
| 6,144,327 A * | 11/2000 | Distinti et al. .............. 341/126 |
| 6,768,225 B2 * | 7/2004 | Chang et al. .................. 307/65 |
| 7,043,648 B2 * | 5/2006 | Tokunaga .................... 713/320 |
| 2003/0218384 A1 * | 11/2003 | Yoneda ........................ 307/19 |
| 2005/0225177 A1 * | 10/2005 | Jacobs et al. ................. 307/82 |

OTHER PUBLICATIONS

Intersil Datasheet, ISL6410, ISL6410A, Sep. 17, 2004, FN9149.3, Single Synchronous Buck Regulators With Integrated FET, pp. 1-13.
Intersil Datasheet, HL7566, Dec. 1, 2004, FN7102.5, Monolithic 6 AMP DC—DC Stop-Down Regulator, pp. 1-14.

* cited by examiner

*Primary Examiner*—Robert L. Deberadinis
*Assistant Examiner*—Hal I Kaplan
(74) *Attorney, Agent, or Firm*—Fogg & Powers LLC; Scott V. Lundberg

(57) ABSTRACT

A power supply circuit contains a plurality of DC-DC converter control loops that provide respectively different control signals. A plurality of output driver stages of given current drive capabilities have their inputs programmably connectable via a set of switches to control signals that may be generated by any of the converter control loops. The output of each output driver stage is externally selectively connectable to any of plural output voltage ports, so that each output voltage port is capable of supplying any of the respectively different output voltages associated with the voltage control signals generated by the DC-DC converter control loops, and has an output current capability that depends upon which output driver stages are coupled to it.

22 Claims, 4 Drawing Sheets

US 7,345,378 B2

POWER SUPPLY CIRCUIT CONTAINING MULTIPLE DC—DC CONVERTERS HAVING PROGRAMMABLE OUTPUT CURRENT CAPABILITIES

FIELD OF THE INVENTION

The present invention relates in general to DC power supply systems and subsystems thereof, and is particularly directed to a user-configurable power supply circuit architecture having a plurality of DC-DC converter controllers, and a plurality of output drive stages providing current capability that are programmable to respond to any of the said controllers.

BACKGROUND OF THE INVENTION

The continuing growth and expansion of the electronics industry has been accompanied by a demand for DC power supplies having a wide variety of performance specifications. Depending upon the application, it is not uncommon for a given product design to employ a plurality of DC power supplies, which not only differ in terms of their output voltages, but which have differing current capabilities among the power supply outputs. Although power supply manufacturers have been able to provide power supplies that meet these and other user needs, each power supply's implementation is often custom-configured to a given specification (e.g., output voltage and output current drive capability). This means that the user must maintain an inventory of different power supply circuits, to accommodate variations in application requirements. To reduce cost and inventory complexity, the user would prefer that performance characteristics of the various circuits within its power supply inventory be programmable or user-configurable.

SUMMARY OF THE INVENTION

In accordance with the present invention, this objective is successfully addressed by a new and improved power supply circuit architecture, which provides a plurality of DC-DC converter control loops that are operative to provide respectively different control signals, together with a plurality of output driver stages having prescribed current drive capabilities, and inputs to which are selectively connectable via a set of programmable switches to control signals generated by any of the converter control loops. The output of each output driver stage is externally selectively connectable by the user to supply any of plural output voltage ports, so that each output voltage port has an output current capability that depends upon which output driver stages are coupled to it.

The user-configurable power supply architecture in accordance with the present invention may be augmented to provide fault detection capability that will enable the user to determine whether the overall power supply circuit has been configured as intended. To this end, a pulse generator may be controllably coupled to the inputs of the programmable switches, and a combinational logic circuit coupled to the phase nodes of the output drivers. In response to the pulse generator supplying a test pulse to the switches, the combinational logic circuit monitors the output nodes of the output driver stages for the presence of output pulses. The monitoring logic should detect an output pulse at one or more additional output nodes, if such output nodes of the plural output driver stages are connected together for supplying a single voltage output port. If a pulse is not detected at each intended output node, it is inferred that there has been a miswiring of the external output node connections.

In addition to connecting additional logic circuitry as a fault detector, that same circuitry can be used to automatically internally configure the connections provided by the respective switches from the controllers to the output driver stages, based upon the external connections made by the user from the output nodes of the output drivers. For this purpose, the user provides external connections from the output drivers' output nodes to feed the voltage output ports that have been defined a priori to be associated with respectively different ones of the voltages produced by the plurality of converter controllers, so as to establish the intended amperage for the voltage port of interest. By pulsing the gate inputs to the switches, a logic circuit looks to see at which output nodes an output pulse is produced. Knowing which output nodes produce output pulses, and with the output nodes being connected to one of the voltage output ports, the logic circuit can automatically configure the output drivers' input switches to the appropriate controller associated with that voltage port.

DETAILED DESCRIPTION

Figure 1A:
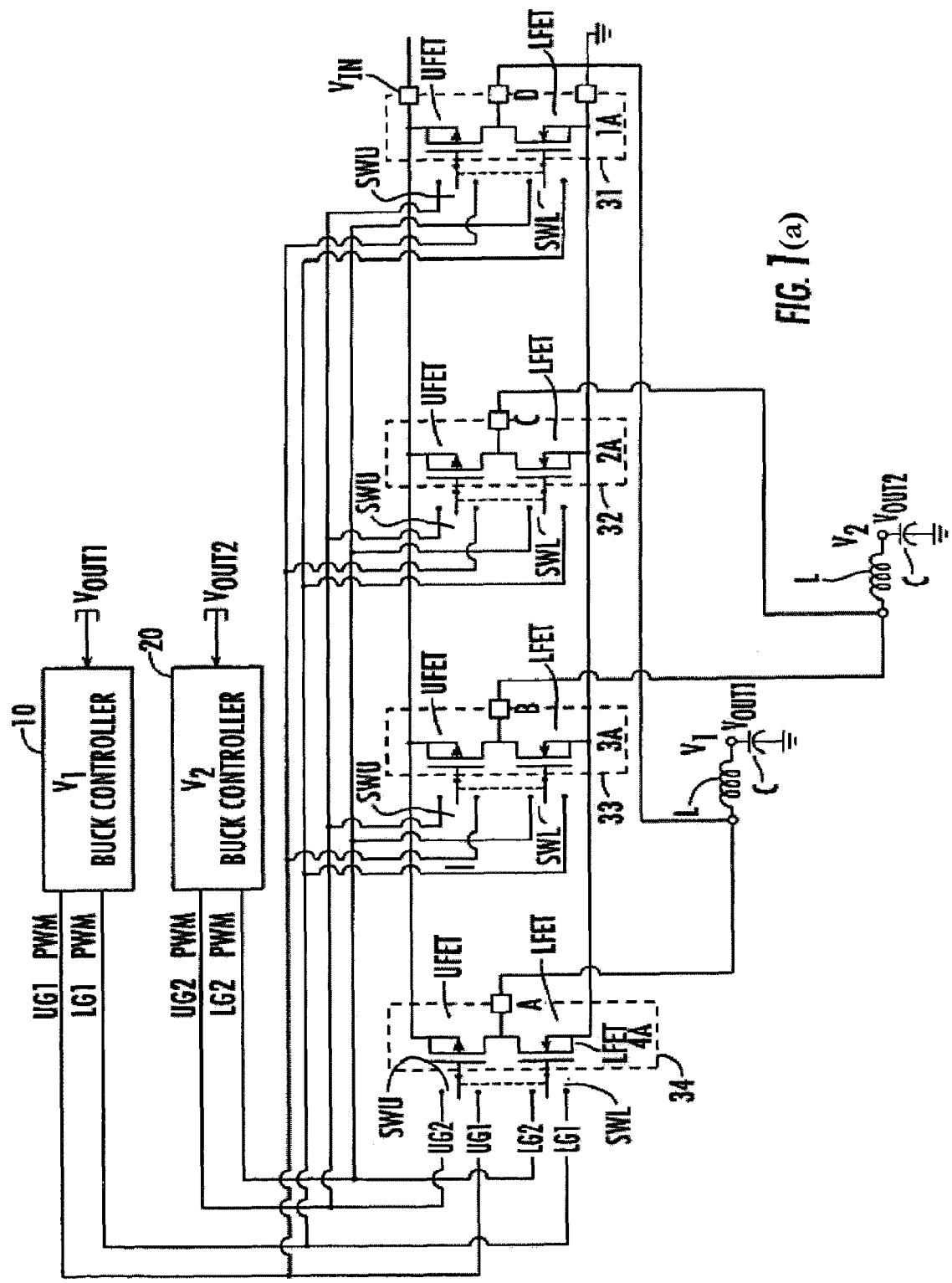
FIG. 1($a$) is a schematic-block diagram of the general architecture of a user-configurable synchronous buck power supply circuit architecture in accordance with the invention, while FIG. 1($b$) is a schematic-block diagram of the general architecture of a user-configurable synchronous boost power supply circuit architecture in accordance with the invention.

Before detailing the user-configurable power supply circuit architecture of the invention, it should be observed that the present invention resides primarily in a novel combination of conventional controlled power supply and switching circuits and components therefor. In a practical implementation, these circuits and components may be readily implemented using field programmable gate array (FPGA)-configured, application specific integrated circuit (ASIC) chip sets and associated power MOSFETs. Consequently, the configuration of such circuits and components have, for the most part, been depicted in the drawings by readily understandable schematic-block diagrams, which show only those specific features that are pertinent to the present invention, so as not to obscure the disclosure with details which will be readily apparent to those skilled in the art having the benefit of the description herein. Thus, the diagrammatic illustrations are primarily intended to show the major functional components of the invention in convenient groupings that will enable the present invention to be more readily understood.

Figure 1B:
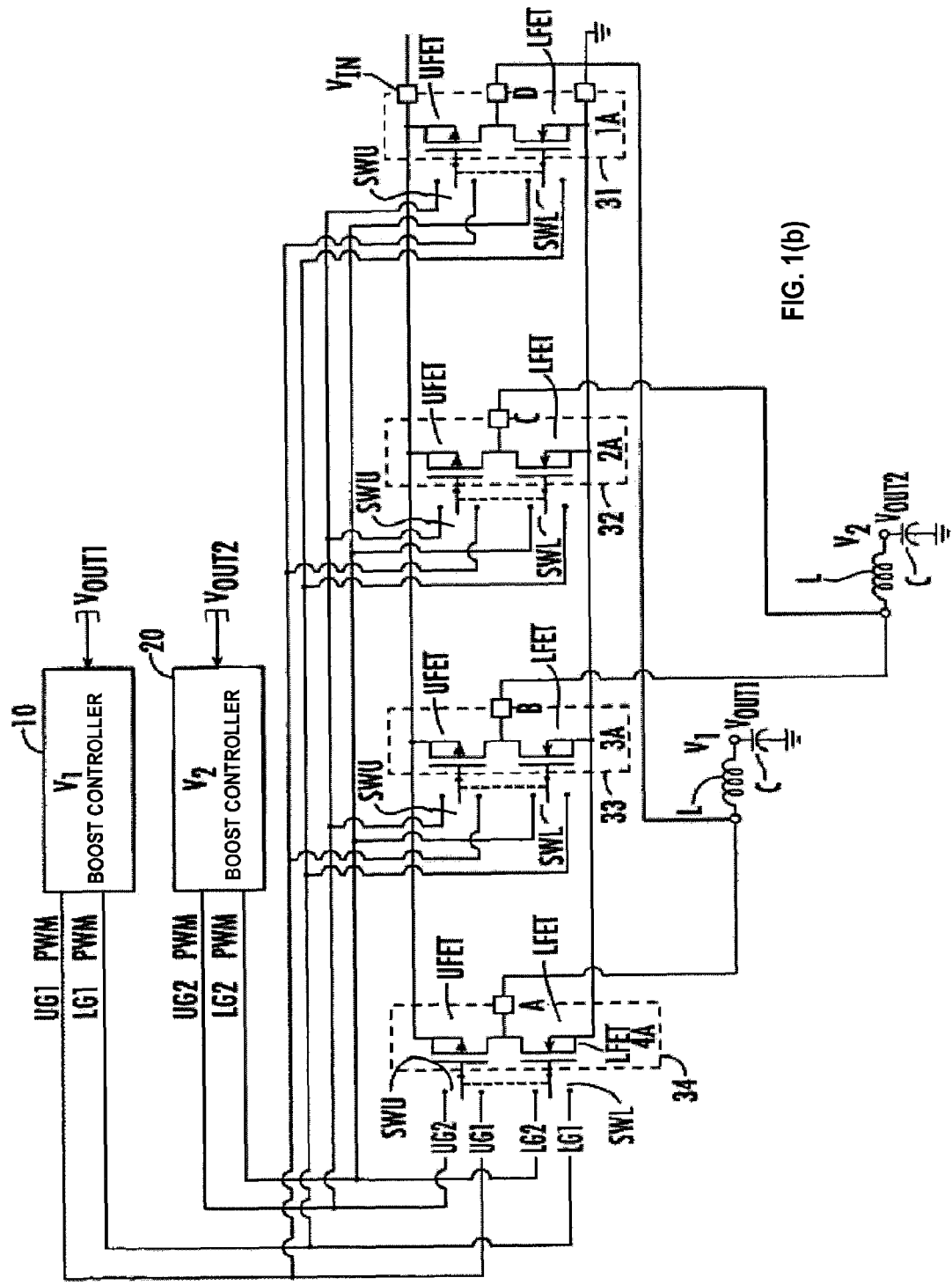

The synchronous buck converter has been generally selected for representation in FIGS. 1($a$), 2 and 3 and detailed description, but the invention is equally applicable to standard buck, standard boost, synchronous boost, and linear converters as will be understood by those skilled in the art. Although only one type of converter has been generally selected for detailed description, the synchronous buck, it is to be understood that the invention is not limited to synchronous buck converters, such as shown by the synchronous boost converter shown in FIG. 1(b).

Attention is now directed to FIG. 1(a), which is a schematic-block diagram of the general architecture of a user-configurable synchronous buck power supply circuit architecture in accordance with the invention. Implementation of the invention may be accomplished by alternative configurations. In one embodiment all of the power supply components may be contained in a common semi-conductor chip. In an alternative embodiment a modular architecture containing multiple circuit chips may be employed. As pointed out briefly above, and as will be detailed hereinafter, the power supply architecture of the present invention contains a plurality of DC-DC converter control loops that are operative to provide respectively different control signals, PWM signals for switching regulators and bias voltages for linear regulators, associated with different output voltages capable of being supplied by the circuit. In the illustrated embodiment, only two such control loops, designated buck controller 10 and buck controller 20, are shown. It is to be understood, however, that the invention is not limited to this or any other number. The number of control loops in the architecture of FIG. 1(a) has been limited to two, in order to reduce the complexity of the drawings, while still providing a readily understandable illustration of both the architecture and functionality of the invention.

In a similar manner, although only four (power MOSFET-based) output driver stages (designated output driver stages 31, 32, 33, 34) and only two output voltage terminals (designated output terminals Vout1 and Vout2) have been shown, it is to be understood that the invention is not limited to these or any other numbers of output driver stages or output voltage terminals. As in the case of illustrating only two control loops 10 and 20, the illustrated numbers of output driver stages and output voltage terminals are for the purpose of facilitating a ready understanding of the functionality and architecture of the invention, without unduly burdening the drawings.

In order to provide an appreciation for the considerable flexibility that is offered by the architecture of the present invention, each of the output driver stages 31-34 has a respectively different current drive capability. It is to be observed, however, that the current drive capabilities of the output driver stages need not be respectively different from one another; they may be the same, or differ in any manner desired. For purposes of the present description, output driver stage 31 may have a one amp (1A) current drive capability, output driver stage 32 may have a two amp (2A) current drive capability, output driver stage 33 may have a three amp (3A) current drive capability, and output driver stage 34 may have a four amp (4A) current drive capability.

Each output driver stage includes an upper electronic driver device, such as an upper power field effect transistor, or UFET, having its source-drain current flow path coupled between an upper power supply rail (shown as $V_{IN}$) and a common or phase node, which corresponds to one of the phase nodes A, B, C and D. Each of the phase nodes of the output driver stages constitutes an available output port that is intended to be selectively externally connected to one end of an output inductor L, a second end of which is coupled to an output filter capacitor C and one of a pair of output voltage ports Vout1 and Vout2 of the overall power supply.

Each output driver stage further includes a lower electronic driver device, such as a lower power FET, or LFET, having its source-drain current flow path coupled between a lower power supply rail (shown as being connected to ground) and one of the phase nodes A, B, C and D.

In an integrated circuit realization of the invention the inductors and output capacitors would be external to the integrated circuit, and the phase nodes of the output stages would be individually available to connect as required. In a multi-component module realization, inductors and capacitors would be included in the module with access to pins allowing arbitrary connection to output stages and output voltage ports.

The gate control input to the UFET of a respective output driver stage is selectively coupled through an upper input switch SWU to the upper PWM output of a selected buck controller which, in the illustrated embodiment corresponds to either buck controller 10 or buck controller 20. Similarly, the gate control input to the LFET of a respective output driver stage is selectively coupled through a lower input switch SWL to the lower PWM output of one of the buck controllers 10 and 20. Buck controller 10 provides PWM gate drive signals UG1 and LG1 associated with a first output voltage V1, and being respectively available for controlling the turn ON/OFF times of the UFET and LFET of an output driver stage controlled thereby, while buck controller 20 provides PWM gate drive signals UG2 and LG2 associated with a second output voltage V2, and being respectively available for controlling the turn ON/OFF times of the UFET and LFET of an output driver stage controlled thereby.

As a non-limiting example, in the illustrated embodiment of a dual buck DC-DC converter architecture having a two-fold output voltage supply capability (V1 and V2), the input switches SWU and SWL that are used to interface the outputs of the buck controllers with the control inputs of the output driver stages may be readily implemented as digital components, such as 2:1 logic gates, control inputs for which comprise single pin connections. These pins are tied to one of a pair of preselected voltages for establishing the path through the switch, as will be readily understood by one skilled in the art.

Considering the (four amp) output driver stage 34, as a non-limiting example, configuring the switches SWU and SWL, so as to connect the gate drive inputs of its UFET and LFET to the PWM gate drive signals UG1 and LG1 supplied by buck controller 10, will result in the output driver stage 34 producing an output waveform consistent with an output voltage of V1 volts in accordance with the PWM signal supplied by buck controller 10, and at a current drive capability of four amps. In order to supply this voltage V1 at external output port Vout1, it is necessary for the user to externally connect the phase node A of output driver stage 34 to the output inductor L that feeds the voltage output port Vout1. This set of connections will result in voltage output port Vout1 supplying an output voltage of V1 volts at a current drive capability of four amps.

If it is desired to increase the current drive capability from its value of four amps for the output voltage V1 being supplied at the voltage output Vout1, it is necessary to configure the input switches SWU and SWL for the UFET and LFET pairs of one or more of the other output driver stages 33, 32 and 31, in the same manner described above for the four amp output driver stage 34, and to also provide a connection between one or more of the phase nodes B, C and D of these output driver stages to the input side of the inductor L that feeds the voltage output port Vout1.

Take, for example, the case where it is desired to provide voltage output port Vout1 with an output voltage V1 having a five amp current drive capability, and to provide voltage output port Vout2 with an output voltage V2 having a five amp current drive capability. One solution would be to have the (four amp) output driver stage 34 connected in the manner described above, and to also connect the (one amp) output driver stage 31 in the same manner. Namely, the switches SWU and SWL coupled to the control gates of the UFET and LFET of (one amp) output driver stage 31 would be connected to receive the gate drive signals UG1 and LG1 supplied by the buck controller 10. This will result in the one amp output driver stage 31 producing at phase node D waveform in accordance with the PWM signal supplied by buck controller 10, and a current capability of one amp.

In order to supply this additional one amp current drive capability to the output port Vout1, it is necessary for the user to connect the phase node D of output driver stage 31 to the output inductor L that feeds the voltage output port Vout1. What results is a summation of the currents from the four amp node A of the output driver stage 34 and the one amp node D of the output driver stage 31 to the output inductor L that is connected to the voltage output port Vout1. This combining of the outputs of the output driver stages 34 and 31 therefore produces, at voltage output port Vout1, a voltage of V1 volts at a total current drive capability of five amps.

To provide an output voltage V2 at a five amp current drive capability at the voltage output port Vout2, use may be readily made of the two amp and three amp current drive capabilities of the remaining two output driver stages 32 and 33, respectively. Since each of these driver stages is to supply the voltage V2, it is necessary to apply to their associated input switches SWU and SWL, that are respectively coupled to the gates of the UFET and LFET of output driver stages 32 and 33, the PWM gate drive signals UG2 and LG2 that are generated by the V2 voltage buck controller 20. This will cause the output driver stage 32 to produce an output voltage waveform averaging V2 volts and a drive current capability of two amps at the phase node C, in accordance with the PWM signal supplied by buck controller 20.

It will also cause the three-amp output driver stage 33 to produce an output voltage waveform averaging V2 volts and a current drive capability of three amps, in accordance with the PWM signal supplied by buck controller 20. In order to supply, to the output port Vout2, the voltage V2 that is represented as the average at the phase nodes B and C of respective output drive stages 32 and 33, it is necessary for the user to externally connect the phase node B of output driver stage 33 and the phase node C of output driver stage 32 to the output inductor L that feeds the voltage output port Vout2. This results in a summation of the currents from the two-amp node C of output driver stage 32 and the three-amp node B of output driver stage 33 to the output inductor L that is connected to the voltage output port Vout2. This summation of the outputs of output driver stages 32 and 33 therefore produces a voltage V2 having a current capability of five amps at voltage output port Vout2.

It is to be understood that the foregoing description is not limitative of the capabilities of the two buck controller, four output driver stage power supply architecture example shown in FIG. 1(a). Many other output parameters other than the V1/five amp and V2/five amp examples described are possible. Indeed, the dual buck DC-DC converter example of FIG. 1(a) provides for a substantial number of different permutations of either or both voltage outputs V1 and V2, and current drive capabilities at these voltages. As pointed out above, the number of control loops, output driver stages and output ports may be varied as desired without a loss in generality.

For example, the dual buck architecture of FIG. 1(a) can be used to produce a single voltage V1 with a (maximum available) ten amp drive capability at output port Vout1. For this purpose, the switches SWU and SWL feeding each output driver stage are configured to couple the gate inputs to each driver stage's UFET and LFET pair to the PWM UG1 and LG1 outputs of the buck controller 10. In addition, the phase nodes A, B, C and D of respective output drivers 34, 33, 32 and 31 are externally connected to the inductor feeding the output voltage port Vout1. Alternatively, to achieve the same ten amp capability at voltage V2, one would configure the four sets of switches SWU and SWL so that the gate inputs to each driver stage's UFET and LFET pair are coupled to the PWM UG2 and LG2 outputs of the buck controller 20. In addition, each of phase nodes A, B, C and D is externally connected to the inductor feeding the output voltage port Vout2.

FIG. 1(b) is a schematic-block diagram of the general architecture of a user-configurable synchronous boost power supply circuit architecture in accordance with the invention. FIG. 1(b) is identical with respect to FIG. 1(a), except buck controller 10 and buck controller 20 in FIG. 1(a) have been replaced with boost controller 110 and boost controller 120. As known in the art, boost controllers are in a class of switching-mode power supplies that generally contain at least two semiconductor switches (a diode and a transistor) and at least one energy storage element.

Figure 2:
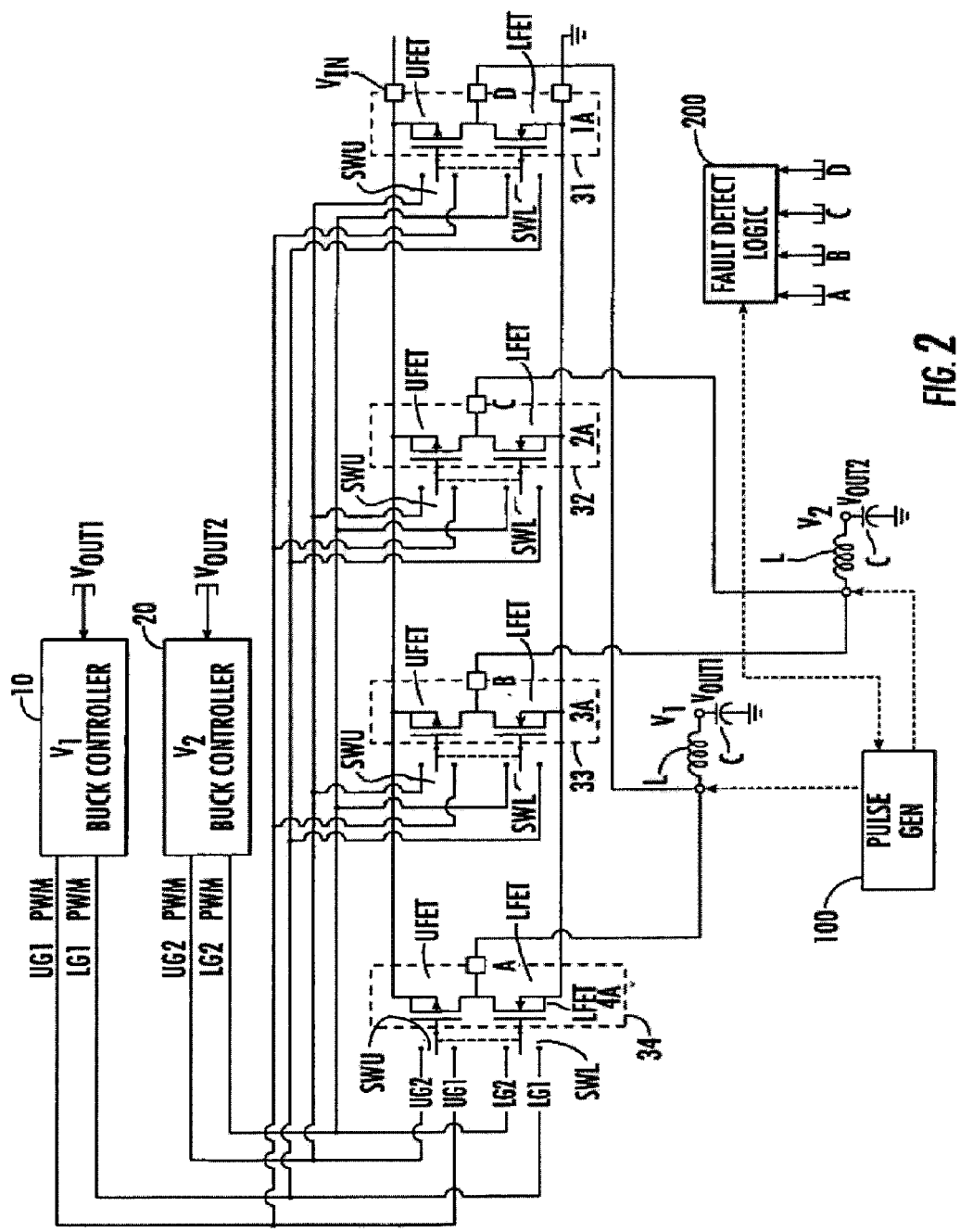
FIG. 2 shows an augmentation of the user-configurable synchronous buck power supply circuit architecture of FIG. 1, which enables the user to determine whether the power supply circuit has been configured as intended.

FIG. 2 shows an augmentation of the user-configurable power supply circuit architecture in accordance with the present invention, which enables the user to determine whether the overall power supply circuit has been configured as intended. In accordance with this embodiment, for each output voltage that is supplied by the power supply circuit (in the above example, a voltage V1 at five amps is to be supplied from output terminal Vout1 and a voltage V2 at five amps is to be supplied from output terminal Vout2), a pulse generator 100 is coupled to the front end of that output voltage terminal's associated inductor L. In addition, a combinational logic circuit 200 is coupled to the phase nodes of the output drivers that should have been externally connected by the user to the front end of an inductor. In the above example, phase nodes A and D should be tied together at the front end of an output inductor L feeding voltage output port Vout1, while phase nodes B and C should be tied together at the front end of an output inductor L feeding voltage output port Vout2.

As an alternative to the use of pulse generator 100, its function may be implemented by selectively supplying a control command to buck controllers 10 and 20, so as to cause selected ones of the output drivers 31, 32, 33 and 34 to generate output pulses at any of nodes A, B, C and D, which are coupled via inductors L to the output ports Vout1 and Vout2.

In response to pulse generator 100 supplying a test pulse to the front end of the inductor L feeding voltage output port Vout1, monitoring logic circuit 200 should detect a response pulse at each of phase nodes A and D. Similarly, in response to pulse generator 100 supplying a test pulse to the front end of the inductor L feeding voltage output port Vout2 monitoring logic circuit 200 should detect a response pulse at each of phase nodes B and C. If each of these response pulses is not detected a fault is indicated for the corresponding phase node. Thus, for example, for the case of voltage output port Vout1, if a response pulse is detected at phase node A, but not at phase node D, it may be inferred that there has been a miswiring of the phase node D of driver stage 31, and a fault indication for phase node D is produced. Likewise, for the case of voltage output port Vout2, if a response pulse is detected at phase node B, but not at phase node C, it may be inferred that there has been a miswiring of the phase node C of driver stage 32, and a fault indication for phase node C is produced.

Figure 3:
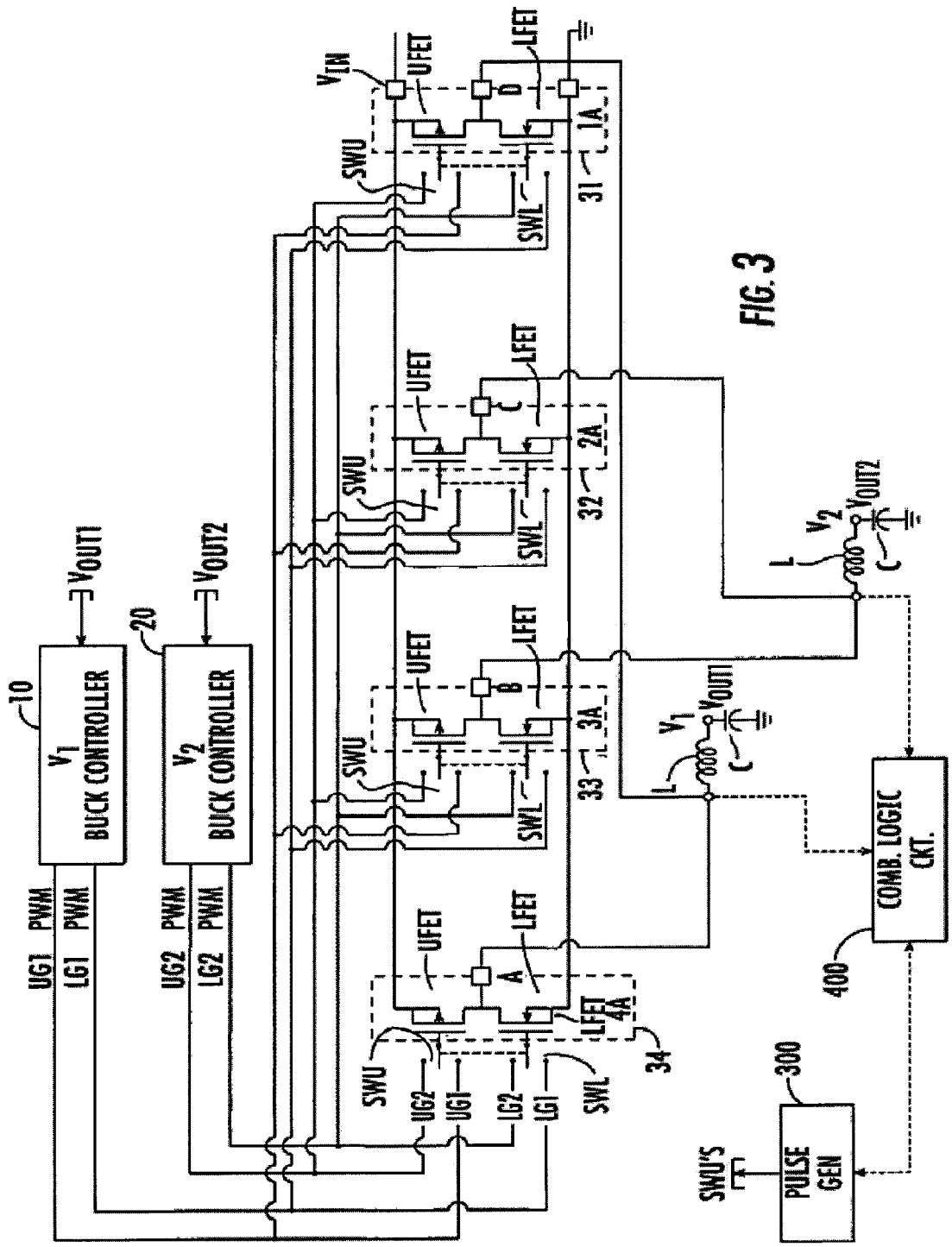
FIG. 3 shows a further augmentation of the user-configurable synchronous buck power supply circuit architecture of FIG. 1, which includes logic circuitry that is operative to automatically internally configure connections provided by respective switches from the buck controllers to the output driver stages.

In addition to connecting fault detection logic circuitry in the manner described above, combinational logic circuitry may also be used to used to automatically internally configure connections provided through the respective switches SWU and SWL from the buck controllers to the output driver stages, based upon the external connections made by the user from the phase nodes of the output drivers to the inductors feeding the voltage output ports. To this end, as diagrammatically illustrated in FIG. 3, the user will have made intended external connections from the output drivers' phase nodes to the inductors feeding the voltage output ports that have been defined a priori to be associated with respectively different ones of the voltages produced by the plurality of buck converters, so as to establish the intended amperage for the voltage port of interest. In addition, input switches SWU and SWL will have a third position that connects the common terminal to the pulse generator and MUX 300 putting all FETs under direct control of the pulse generator with all FETs being normally non-conducting.

The pulse generator and MUX 300 is used to individually pulse the inputs to one of the switches SWU of each respective output driver stage. As a non-limiting example, the pulse may be applied to an upper switch SWU, so that the phase node of a respective driver stage will be briefly pulled high (to the voltage of the upper power supply rail UR) in response to the pulse. A combinational logic circuit 400 then looks at the front ends of the inductors (which have been externally connected by the user to respective phase nodes of the output driver stages) for the presence of a response pulse. For each inductor at which a response pulse is produced, logic circuit 400 knows that an external connection has been provided by the user from the phase node of the output driver stage to the gate of which a pulse has been applied by pulse generator and MUX 300. Knowing which phase nodes produce output pulses, logic circuit 400 may then proceed to selectively enable either upper or lower feedthrough paths of the switches SWU and SWL, and thereby configure the output drivers's input switches to the appropriate buck controller.

As will be appreciated from the foregoing description, the desire to make voltage and current drive output parameters of a power supply user-configurable is readily achieved in accordance with the power supply architecture of the present invention, having a plurality of synchronous buck DC-DC converter control loops that provide respectively different output voltages, together with a plurality of output driver stages having given current drive capabilities, and inputs to which are connectable via a set of selectively (user- or automatically) configurable switches to PWM outputs of any of the buck converter control loops. The output of each output driver stage is selectively connectable by the user to any of plural output voltage ports, so that each output voltage port is capable of supplying any of the respectively different output voltages provided by the synchronous buck DC-DC converter control loops, and has an output current capability that depends upon which output driver stages are coupled to it.

While I have shown and described several embodiments in accordance with the present invention, it is to be appreciated that the same is not limited thereto but, as described above, is susceptible to numerous changes and modifications as will be readily understood by a person skilled in the art. Consequently, I do not wish to be limited to the details shown and described herein, but intend to cover all such changes and modifications as are obvious to one of ordinary skill in the art.

What is claimed:

1. A power supply comprising:
a multiplicity of DC-DC converter controllers;
a plurality of output driver stages having prescribed current drive capabilities, and
a plurality of programmable switching circuits coupled between outputs of said DC-DC converter controllers and control inputs of said plurality of output driver stages, wherein said DC-DC converter controllers are selectively connectable by said switching circuits with one or more of said plurality of output driver stages, so as to provide at one or more voltage output ports one or more output voltages having individually programmable output current drive capabilities
wherein said DC-DC converter controllers are selectively coupled in closed circuit loops between outputs and inputs of one or more of said plurality of output driver stages.

2. The power supply according to claim 1, wherein respective ones of said DC-DC converter controllers are operative to produce analog control signals that are associated with respectively different output voltages.

3. The power supply according to claim 1, wherein respective ones of said DC-DC converter controllers are operative to produce pulse width modulation output signals that are associated with respectively different output voltages.

4. The power supply according to claim 1, wherein respective ones of said plurality of output driver stages have different current drive capabilities.

5. The power supply according to claim 1, further including a fault detection circuit that is operative to supply a given signal to inputs of said programmable switching circuits, and a combinational logic circuit coupled to outputs of said output driver stages, said combinational logic circuit being operative to monitor said outputs of said output driver stages for the presence of output signals responsive to said given signal in order to detect whether outputs of said output driver stages have been misconnected to said one or more output voltage ports.

6. The power supply according to claim 1, further including circuitry that is operative to automatically configure connections through said programmable switching circuits in accordance with the manner in which outputs of said output driver stages have been connected to said one or more output voltage ports.

7. The power supply according to claim 1, wherein said DC-DC converter controllers comprise standard buck DC-DC converter controllers.

8. The power supply according to claim 1, wherein said DC-DC converter controllers comprise synchronous buck DC-DC converter controllers.

9. The power supply according to claim 8, wherein a respective output driver stage comprises a pair of power field effect transistors (FETs) having current flow paths therethrough coupled between respectively different voltage rails, and control inputs thereof coupled to outputs of programmable switching circuits, inputs of said programmable switching circuits being coupled to receive pulse width modulated signals supplied by a selected one of said synchronous buck DC-DC converter controllers, and wherein a common node of said pair of power FETs are coupled through an output inductor to an output voltage terminal associated with said selected one of said synchronous buck DC-DC converter controllers.

10. The power supply according to claim 1, wherein said DC-DC converter controllers comprise standard boost DC-DC converter controllers.

11. The power supply according to claim 1, wherein said DC-DC converter controllers comprise synchronous boost DC-DC converter controllers.

12. The power supply according to claim 10, wherein a respective output driver stage comprises a pair of power field effect transistors (FETs) having current flow paths therethrough coupled between respectively different voltage rails, and control inputs thereof coupled to outputs of programmable switching circuits, inputs of said programmable switching circuits being coupled to receive pulse width modulated signals supplied by a selected one of said synchronous boost DC-DC converter controllers, wherein the common node of said power FETs is coupled through an input inductor to a supply voltage rail, and wherein one of the said FETs is connected to an output voltage terminal associated with said selected one of said standard boost DC-DC converter controllers.

13. The power supply according to claim 1, further comprising a single common substrate, wherein said multiplicity of DC-DC converter controllers, said plurality of output driver stages having prescribed current drive capabilities, and said plurality of programmable switching circuits are formed in said common circuit substrate.

14. The integrated power supply circuit according to claim 13, wherein respective ones of said DC-DC converters are operative to produce respectively different output voltages.

15. The integrated power supply circuit according to claim 14, wherein respective ones of said DC-DC converters are configured to produce said different output voltages at the same or different current drive capabilities.

16. An integrated power supply circuit comprising:
a common circuit substrate containing a plurality of DC-DC converter control loops that are operative to provide respectively different control signals, a plurality of output driver stages having prescribed current drive capabilities, and having inputs selectively connectable via a set of programmable switching circuits to outputs of any of said plurality of DC-DC converter control loops, and wherein outputs of said output driver stages are externally selectively connectable to any of a plurality of output voltage ports, so that each output voltage port is capable of supplying any of respectively different output voltages established in accordance with said respectively different control signals provided by said DC-DC converter control loops, and wherein each output voltage port has a programmable output current capability that depends upon which of said plurality of output driver stages are coupled to it.

17. The integrated power supply circuit according to claim 16, wherein at least one output driver stage has a current drive capability that is different from at least one other output driver stage.

18. The integrated power supply circuit according to claim 17, wherein respective ones of said DC-DC converter control loops are configured to produce said different output voltages at the same or different current drive capabilities.

19. The integrated power supply circuit according to claim 16, further including a fault detection circuit that is operative to supply a given signal to inputs of said programmable switching circuits, and a combinational logic circuit coupled to outputs of said output driver stages, and being operative to monitor said outputs of said output driver stages for the presence of output signals responsive to said given signal in order to detect whether outputs of said output driver stages have been misconnected to said one or more output voltage ports.

20. The integrated power supply circuit according to claim 16, further including circuitry that is operative to automatically configure connections through said programmable switching circuits in accordance with the manner in which outputs of said output driver stages have been connected to said one or more output voltage ports.

21. The power supply according to claim 1, wherein said plurality of programmable switching circuits are externally programmable.

22. The integrated power supply circuit according to claim 16, wherein said plurality of programmable switching circuits are externally programmable.

* * * * *